United States Patent [19]

Trumbore et al.

[11] Patent Number: 5,342,866
[45] Date of Patent: Aug. 30, 1994

[54] OXIDIZED ASPHALT RUBBER SYSTEM

[75] Inventors: David C. Trumbore, LaGrange; Michael R. Franzen, Lombard, both of Ill.; Charles R. Wilkinson, State College, Pa.

[73] Assignee: Owens-Corning Fiberglas Technology Inc., Summit, Ill.

[21] Appl. No.: 998,718

[22] Filed: Dec. 30, 1992

[51] Int. Cl.5 .............................................. C08L 95/00
[52] U.S. Cl. ..................................... 524/68; 106/273.1
[58] Field of Search ......................... 524/68; 106/273.1

[56] References Cited

U.S. PATENT DOCUMENTS

| | | | |
|---|---|---|---|
| 3,329,636 | 7/1967 | Henschel | 524/68 |
| 3,853,799 | 12/1974 | Behling et al. | 524/68 |
| 4,196,115 | 4/1980 | Bresson | 524/68 |
| 4,425,454 | 1/1984 | Goodrich | 524/64 |
| 4,454,269 | 6/1984 | Goodrich | 524/69 |
| 4,503,176 | 3/1985 | Barlow et al. | 524/68 |
| 4,530,652 | 7/1985 | Buck et al. | 524/68 |
| 4,559,267 | 12/1985 | Freshwater et al. | 428/352 |
| 4,585,816 | 4/1986 | Vitkuske et al. | 524/68 |
| 4,824,880 | 4/1989 | Algrim et al. | 524/68 |
| 4,835,199 | 5/1989 | Futamura et al. | 524/68 |
| 4,882,373 | 11/1989 | Moran | 524/68 |
| 4,923,913 | 5/1990 | Chich et al. | 524/68 |
| 4,956,500 | 9/1990 | Vermilion | 524/68 |
| 5,036,119 | 7/1991 | Berggren | 524/68 |
| 5,118,733 | 6/1992 | Gelles et al. | 524/68 |

FOREIGN PATENT DOCUMENTS 0087461  5/1982  Japan ........................ 524/68

*Primary Examiner*—Peter Szekely
*Attorney, Agent, or Firm*—Ted C. Gillespie; Charles H. Ellerbrock

[57] ABSTRACT

The present invention provides an elastomeric-asphalt composition which does not phase separate and which is compatible at high temperatures. This compatible material can be produced without the need to use high shear milling equipment. The elastomeric-asphalt composition is not limited by the tendency of other elastomer polymers to be incompatible with asphalt nor does the composition separate into a polymer-rich phase and an asphalt-rich phase. In a preferred embodiment, the elastomeric materials are SBS and SIS block copolymers.

10 Claims, 3 Drawing Sheets

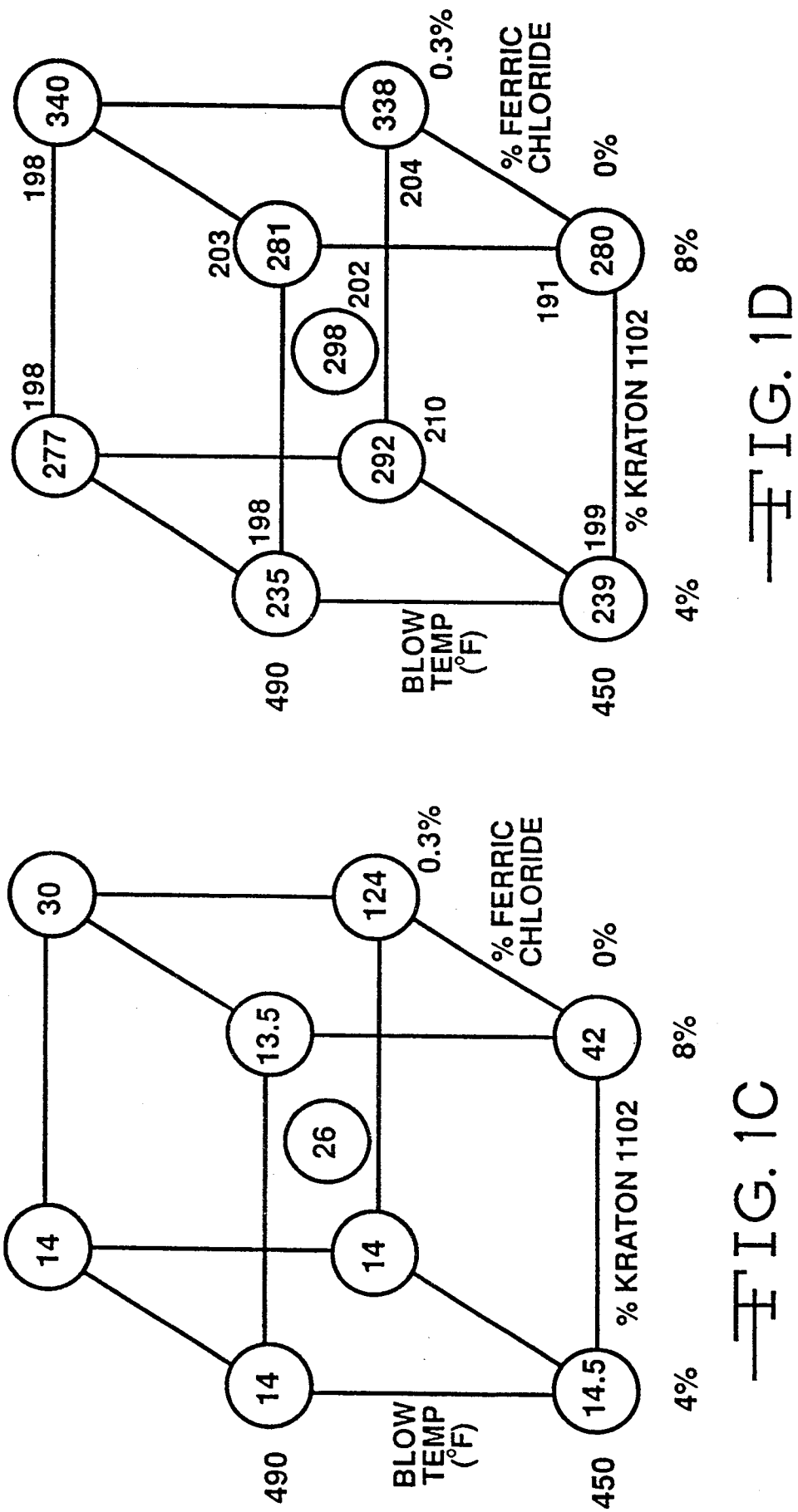

OXIDIZED ASPHALT RUBBER SYSTEM

FIELD OF THE INVENTION

The present invention relates to an oxidized asphalt rubber system and more particularly to the reaction of rubbers with asphalt during the oxidizing process which results in greatly improved compatibility. The oxidized asphalt rubber system of the present invention is a blown blend of asphalt and polystyrene-based block copolymers. The oxidized asphalt rubber system blend remains homogenous even under hot storage conditions, and may be blended with air blown asphalt without encountering compatibility problems.

BACKGROUND ART

The asphalts now generally commercially produced encounter problems due to the viscoelastic behavior and low temperature performance along with resistance to flow at high temperatures. These characteristic defects are well known to those skilled in the art. It has been the practice, heretofore, to treat asphalt in order to attempt to obtain a more desirable material. One conventional treatment for this purpose involves blending air blown and other asphalts with a small amount of an olefin polymer and other resins, as is exemplified in U.S. Pat. No. 3,329,636 which does not mention or suggest blowing a polymer/asphalt blend.

Other methods to produce asphalt materials include, for example, blending asphalt and polystyrene-polybutadine-polystyrene (SBS) or polystyrene-polyisoprene-polystyrene (SIS) polymers (also sometimes referred to as ABA-type polymers). Representative patents showing such blends include U.S. Pat. Nos. 4,530,652; 4,824,880; 4,835,199; 4,923,913; 5,036,119 and 4,559,267. These references do not show the concept of blowing blends of such types of polymers in asphalt. Further, these blends would require high shear mixing equipment in order to form an asphalt material. In the past this type of equipment has not been used in asphalt processing plants.

Further, U.S. Pat. No. 4,585,816 which discusses the problems associated with the presence of air during the blending operation of asphalt with block copolymers also fails to teach blowing blends of polymer and asphalt.

It is also known to react ABA (or SBS) type polymers and asphalt blends using free radical generators such as for example, peroxide compounds as discussed in for example, U.S. Pat. Nos. 4,503,176 and 4,956,500. However, these do not disclose air blowing a blend of asphalt and polymer.

Further, it has been known that a blend of asphalt and an ethylene-vinyl-acetate copolymer can be air blown, as disclosed in U.S. Pat. Nos. 4,454,269 and 4,425,454. In particular, the '269 reference discusses that in simple blending of EVA with already air blown, high softening point industrial asphalt that the blend was incompatible. While the '269 patent uses a particular asphalt/EVA blend and air blowing method, comparative testing conducted by the inventors herein showed that the EVA-based products produced incompatible materials. Further, these references do not teach or suggest the use of styrene-based block copolymers.

Thus, there is a need to further develop specific asphalt polymer systems which are superior to the asphalt-EVA blown blends and are superior to materials formed from typical polymer blends with asphalt. Further, mere blends of SBS and SIS polymers with previously air blown asphalts are extremely incompatible to the point of not being useful materials.

It is therefore an object of the present invention to provide a process for preparing compositions of SBS and SIS polymers blended and reacted into asphalt wherein the product of the process has excellent tensile and enlongation properties and compatibility and also has acceptable storage stability.

In another aspect, it is an object of the present invention to provide an elastomeric-asphalt composition which is the product of this process.

DISCLOSURE OF INVENTION

The present invention provides an elastomeric-asphalt composition which does not phase separate and which is compatible at high temperatures. This compatible material can be produced without the need to use high shear milling equipment. The elastomeric-asphalt composition is not limited by the tendency of other elastomer polymers to be incompatible with asphalt in simple blends nor does the composition separate into a polymer-rich phase and an asphalt-rich phase. In a preferred embodiment, the elastomeric materials are block copolymers with polystyrene end blocks and unsaturated elastomeric mid blocks, such as for example, styrene-butadiene-styrene (SBS) and styrene-isoprene-styrene (SIS) block copolymers.

A process is provided to produce an asphalt composition comprising: providing about 85–99% asphalt to an air-blowing converter along with about 1–15% by weight SBS or SIS block copolymer and in certain embodiments from about 0 to about 0.5% by weight ferric chloride. Air is injected into the mix of asphalt-block copolymer and ferric chloride after the polymer is charged into the converter. The resulting blend, or batch, is air blown for a suitable period of time. The temperature is controlled to give appropriate reaction time depending on the desired characteristics of the final composition and is preferably between about 400° to about 475° F. The pressure is determined by the process conditions and is preferably kept under about 2 psig. The batch end point is determined by the desired softening point, penetration or viscosity measurements. The composition so produced can be packaged either cold for re-melting for end use or can be shipped in bulk for more immediate use. It is also contemplated that antioxidants or other desired additives may be added at a point in the process to aid in temperature stability to the resultant material. The resulting material may also be blended with air blown asphalts to produce a compatible material.

It has surprisingly been found that batch formulations can be adjusted to take advantage of the positive aspects of air blown asphalts, namely enhanced viscoelastic behavior (i.e., more pliability at low temperature and resistance to flow at high temperatures) with the positive aspects of polymer-modified asphalts, namely toughness, elongation, low temperature performance and the like with no compatibility or separation problems.

BRIEF DESCRIPTION OF THE FIGURES

FIGS. 1A through 1D are a depiction of a test of the different properties for a composition comprising asphalt, Kraton ® 1102 thermoplastic polymer, and, optionally ferric chloride at different blow temperatures:

(A) elongation at 32° F. (inches);
(B) toughness at 0° F. (lb-in);
(C) cold flex at 0° F. (degrees to break); and,
(D) softening point after one week at 350° F.

Figure 1B:
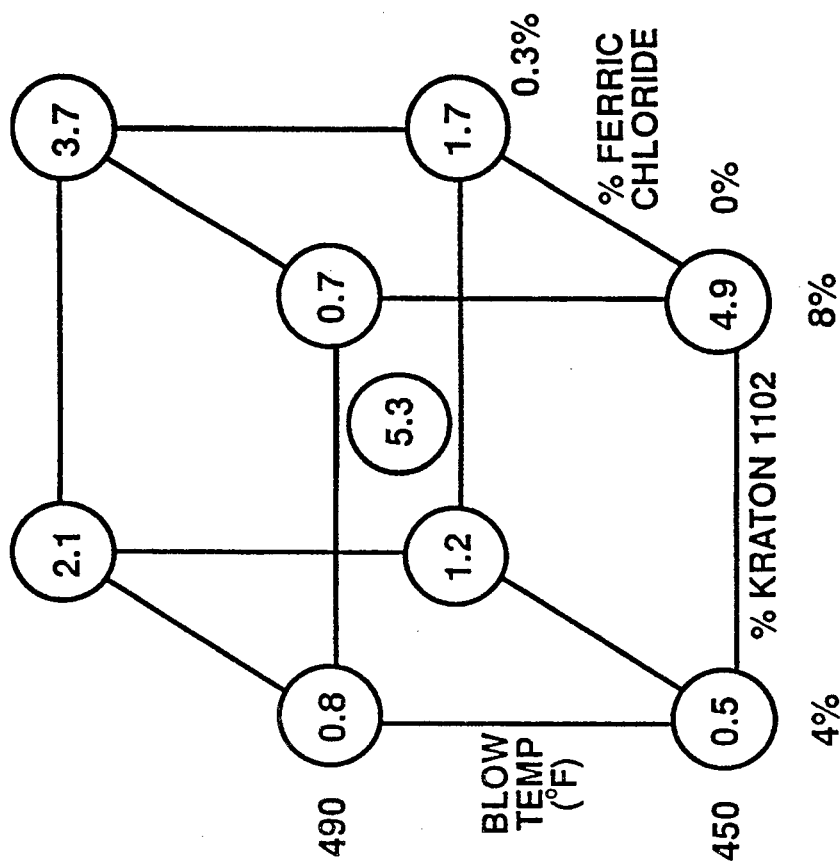
Figure 1A:
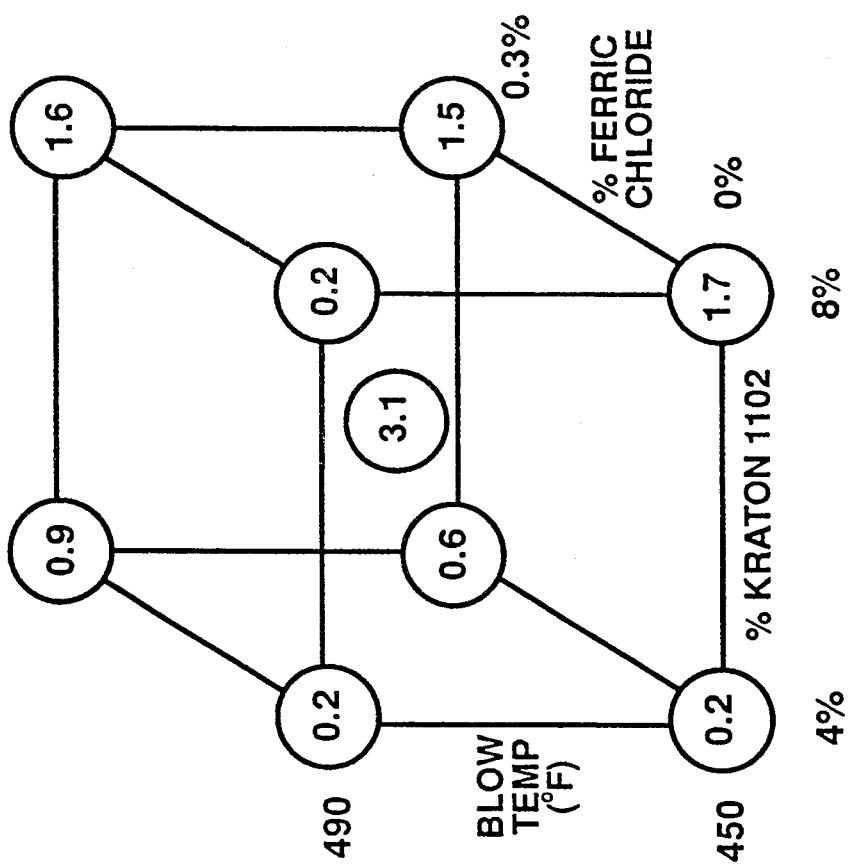
Figure 2:
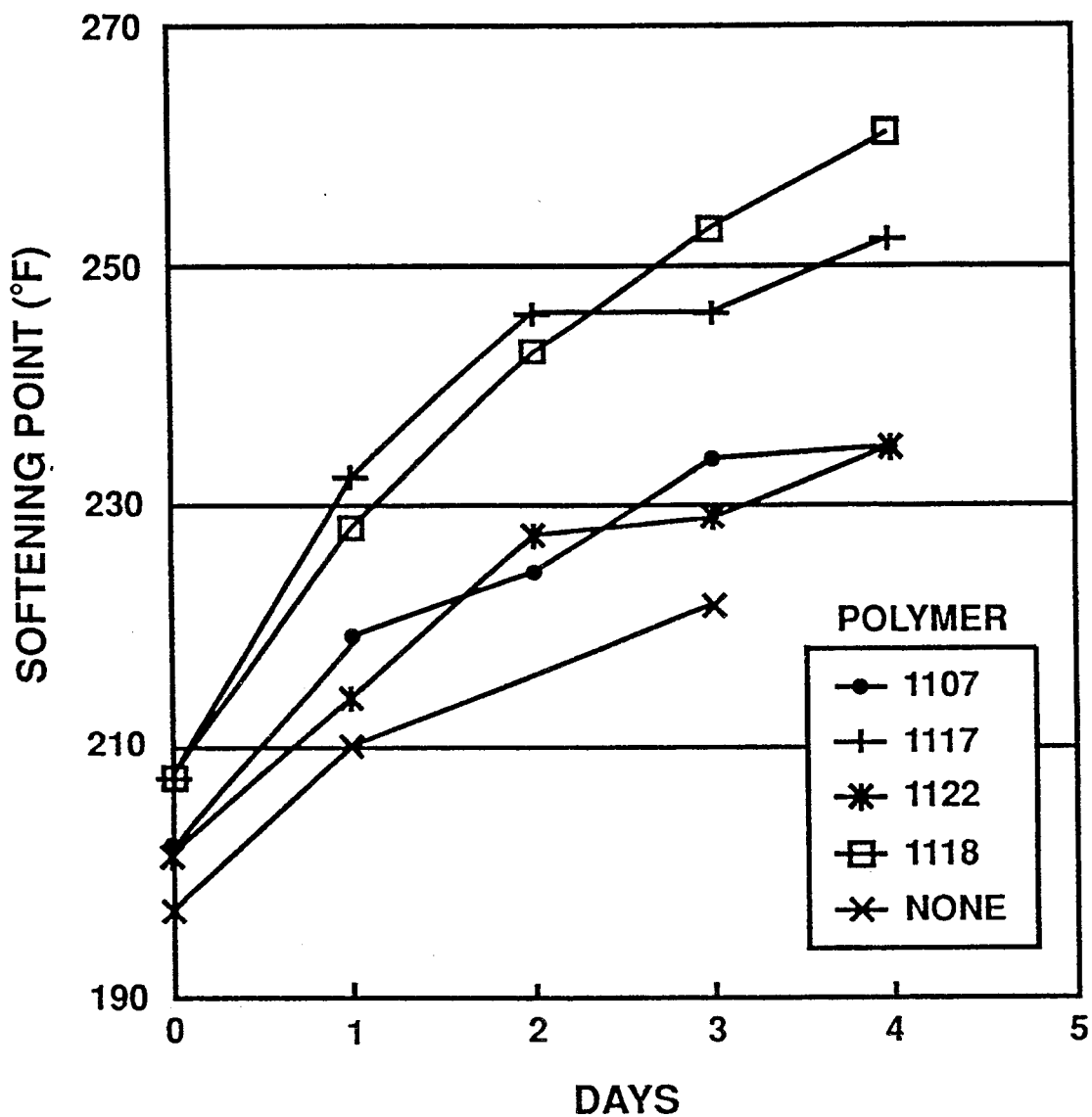

FIG. 2 is a graph showing the growth of the softening point (SP) with heat aging for oxidized asphalt rubber systems (OARS) containing polymers Kraton® 1107, Kraton® 1117, Kraton® 1122, Kraton® 1118 and no polymer.

BEST MODE OF CARRYING OUT INVENTION

The asphalt useful with the present invention may have properties which vary widely and can be used depending upon the desired properties of the composition and its end use. The physical properties of the asphalts used in this invention vary widely even from the same source. The asphalts used in the examples are in no way intended to limit the present invention. The asphalts employed in forming the composition of the present invention are preferably vacuum distillation residues; for example, paving grades or fluxes employed to make roofing-grade asphalts or blends of these with propane de-asphalted residues (PDA). A particularly suitable asphalt is a roofing flux with low saturate, high polar aromatic content by itself or blended with a low asphaltene content PDA.

The elastomers used in the present invention are block copolymers with polystyrene end blocks and unsaturated elastomeric mid blocks, usually tri-block (A-B-A) and may be linear or radial in structure. Suitable elastomers include thermoplastic rubbers of styrene-butadiene-styrene (SBS), and styrene-isoprene-styrene (SIS) block copolymers. Suitable elastomers are commercially available from the Shell Chemical Company (Houston, Tex.) as Kraton®. Most preferred are Shell's Kraton®-1122 (SBS rubber product which is a branched copolymer containing about 37% styrene and 63% butadiene, and Kraton® 1107, a linear SIS copolymer containing about 14% polystyrene and about 86% polyisoprene.

According to the present invention, the elastomer or rubber is added to asphalt and mixed prior to air blowing of the mixture. It is contemplated that various gases including air, oxygen and an oxygen-inert gas mixture can be utilized in the present invention. While not wishing to be bound by theory it is believed that asphalt free radicals formed during air blowing react with sites on the polymer formed by degradation of unsaturated mid blocks caused by heat and exposure to air. This forms a chemically grafted asphalt polymer system, a different product than could be formed by simple blending of a thermoplastic polymer with any asphalt or by air blowing just asphalt alone.

This is in direct contrast to the previously produced asphalt products wherein SBS and SIS polymers were not exposed to either the temperatures used in the present system or to oxygen in the presence of these temperatures. Prior research in this area between air blown asphalts thereafter mixed with thermoelastic polymers resulted in gross system incompatibility.

The present invention thus shows that styrene-based latex, styrene-based rubber and styrene-butadiene-styrene and styrene-isoprene-styrene block copolymers are compatible in this process. This compatibility is measured by reviewing whether separation after storage at 350° F. for 24 hours occurs. The product properties are influenced by blow temperature, the level of thermoelastic polymer, the choice of asphalt, and in certain embodiments, the addition of a ferric chloride catalyst.

The following examples are presented for the purpose of further illustrating the nature of the present invention and are not considered as a limitation of the scope thereof. Parts and percentages shown in the examples are by weight, unless otherwise indicated.

EXAMPLE 1

Amoco flux and Kraton® 1102 were mixed together and were blown to a target softening point of about 200° F. The blow temperature ranged between about 450° F. to about 490° F. The percent of Kraton® 1102 ranged from about 4% to about 8% and the percent of ferric chloride ranged from about 0–0.3%. The product properties to be tested included softening point, penetration at 77° F., viscosity at 300°–350°–400° F., tensile and elongation at 77° F. and 32° F., cold flex at 0° F., resistance to flow at 150° F., heat stability at 350° F. for one week, microscopic appearance and separation.

The tack and feel of the samples plus the observed compatibility makes this material an attractive candidate for adhesives, especially for shingle laminating adhesives and shingle adhesive. The results of these tests are shown in the FIGS. 1A to 1D. The batches of the present invention are completely compatible while the experimental batches with blending blown asphalt and polymer to the same end point produced completely incompatible products.

The elongation, toughness and cold flex all showed large overall increases in properties with the material of the present invention as compared to asphalt standards blown without any polymer. In these tests, these properties improved with higher thermoplastic polymer content and showed the an erratic effect with the addition of ferric chloride. The best values for the elongation and toughness measurements were at the center point while for the cold flex the best values were at the lower right hand corner. The fourth graph (1D) shows a tendency of heat aged materials to increase in softening point. This may have been caused by partially solvated polymer becoming more solvated with aging. Alternatively, this could have been caused by further reaction. The tendency for increase in softening point was worse at the higher polymer loadings and at higher ferric chloride concentrations. Subsequent examples show cases where this growth was limited to acceptable values.

EXAMPLE 2

A series of polymers were tested at the mid point conditions described above (6% polymer, 470° F., blow time and 0.15%, by weight, ferric chloride). A summary of the results are presented in Table 1 below. It is interesting to note that a compatible product with property enhancement and property growth versus storage was observed for all polymers with unsaturated mid block rubber sections. This suggests degradation of the polymer at the mid block followed by reaction to one of the many free radical sites created on the asphalt molecule during air blowing. In contrast when SEBS with its saturated mid-block was used, there was no apparent reaction, no compatibility, no property enhancement or property growth. Also, EVA, with its side chain unsaturation, showed some property enhancement but did not achieve compatibility.

EXAMPLE 3

A series of tests were conducted with several different polymers at the center point of the previous factorial design discussed above to screen for the effect of polymer types on the properties of the oxidized asphalt rubber system (OARS) of the present invention. The results shown in Table 2 show that the two polymers namely Kraton ® 1122 which is an SBS of relatively low molecular weight and high polystyrene content (37% polystyrene, branched copolymer 670 CPS at 77° F. in 25% solution in Toluene) and Kraton ® 1107, an SIS polymer, 14% polystyrene, linear, 1600 CPS at 77° F., in 25% Toluene showed a good increase in toughness, penetration, viscosity and elongation with relatively minor increases in softening point on heat aging. A curve of softening point versus time during heat aging is shown in FIG. 2. It is interesting to note the straight steep asphalt also ages and that the product made with Kraton ® 1107 and 1122 are closer in behavior to these asphalts than to the other polymers shown. The leveling out of these curves was also used to produce a more stable product by heat soaking the material after air-blowing is complete.

EXAMPLE 4

The process of the present invention and the product produced thereby shows remarkable compatibility of the final product, that is the homogeneity of the mixture even under heated storage conditions. In contrast, mere blends of SBS and SIS and random SB polymers with air blown asphalts are extremely incompatible to the point of not being useful materials. This example shows that work with random SB polymers using this process produces inferior products because of large increases in the softening point of the finished product upon heat aging, often showing increases up to about 100° F.

Thus, the oxidized asphalt rubber system and process of the present invention is superior to both blends of SB/blown asphalt due to the incompatibility thereof and to blown blends of SB/asphalt because of the softening point increases therein.

Further, comparative tests using EVA in a similar process shows incompatible results with Lavogen flux, which because it is low it saturates and high in polar aromatics, is one preferred asphalt for this process. In particular, comparative tests were performed using the EVA as disclosed in the above-identified Goodrich patents, namely the ELVAX40P at a concentration in the recommended range therein. This range was very close to the preferred concentration both with and without ferric chloride catalyst. The results of these tests are shown in the attached Table 3 below. As can be seen in Table 3 there are benefits to the SBS and SIS materials in cold flex and heat aging. However, the real distinction of this process remains its remarkable compatibility. Further, as shown in Table 3 only one EVA blend, that blown to 226° F. was compatible while the other three were grossly incompatible with an oily separation at the top of the heat aged samples and having softening points in some cases of less than half of the bulk material. It is also interesting to note that this record of 5 out of 6 EVA tests are incompatible which is in great contrast with the SBS/SIS test wherein only 2 out of a total of 36 tests were incompatible. Those 2 incompatible tests were readily explainable and predicted both due to the high polymer loadings and very short blow times.

EXAMPLE 5

Different types of asphalts were screened with the latroscan method of separating asphalt into four components—saturates, naphthene aromatics, polar aromatics and asphaltenes. The good asphalts for use with the oxidized asphalt rubber system of the present invention with SBS or SIS polymers in certain embodiments are asphalts with high polar aromatic levels and low saturate levels.

A study of blends of air blown asphalt and polymer and of oxidized asphalt rubber system materials made with those materials support the theory of the chemical mechanism of polymer breakdown followed by reaction with the asphalt. A shift was seen in the location of the polymer fraction in the latroscan from naphthene to polar aromatic fraction which suggests either reaction with the polar aromatics or addition of oxygen groups to the polymer. The sensitivity of the success of this approach to asphalt chemistry, particularly the positive impact of the presence of polar aromatics supports the reaction of polymer with polar aromatic fractions of the asphalt.

A modified laminate product has been made using this process: the asphalt polymer system was asphalt-a blend of Total Ardmore Flux and Shell PDA with between 30–40% PDA in the blend; the polymer is Kraton ® 1122 rubber which has a fairly low molecular weight to give good dispersion and a high styrene content to minimize any heat aging problems. The mix portions were optimized along with the polymer amount and blow temperatures. It has also been determined that the ferric chloride is not necessary for the present invention. The range of rubber is from about 4% to about 12% with about 8% being preferred in certain embodiments. It has also been shown that growth in the softening point on heat aging can be mitigated by allowing the material to age up to a predetermined desired softening point during the cooling process prior to pouring. Further, the addition of antioxidants or other suitable additives can be used to control the reaction. In Table 4, the first two columns give standard products, a straight asphalt laminating adhesive and a polymer modified laminating adhesive produced by blending. The next two columns show OARS formulas made with preferred asphalts while the last column shows the results of a similar formula but with asphalt low on polar aromatics and high on saturates. According to the present invention the blowing temperatures can range from about 400° F. to 475° F. with the preferred ranges being about 410° F. to about 450° F. The softening point at shutdown of air can range from about 170° F. to about 195° F. with preferred ranges being about 175° F. to about 180° F.

EXAMPLE 6

Three different oxidizing asphalt-rubber system (OARS) materials were measured after the heat soak and compared to two different batches of modified shingle laminant made by blending asphalt and polymer. As shown in Table 5, the OARS product of the present invention is more compatible, more heat stable, has higher cold bend and cold toughness, is lower in cold bond strengths but shows similar ambient bond strengths and higher hot bond strengths. It is interesting to note that one batch which was purposely made to a base softening point outside the current commercial specifications lost properties on heat soaking.

Although the invention has been described in terms of specific embodiments of a manner the invention may be practiced, this is by way of illustration only and the invention is not necessarily limited thereto since alternative embodiments and operating techniques will become apparent to those skilled in the art. Accordingly, modifications are contemplated which can be made without departing from the spirit of the described invention.

We claim:

1. A method for producing an asphalt composition comprising:

preheating the asphalt to a temperature of at least about 350° F.;

mixing into the asphalt from about 1 to about 15%, by weight based on the weight of the asphalt composition, styrene-based block copolymer and, optionally from about 0 to about 0.5%, by weight, ferric chloride asphalt catalyst to form an asphalt-block copolymer mixture;

charging the asphalt-block copolymer mixture into an asphalt air blowing converter;

heating the mixture to a temperature of from about 400° to about 475° F. while maintaining the pressure in the converter under about 2 psig; and, blowing through the mixture air, oxygen, or an oxygen-inert gas mixture for sufficient time to cause the asphalt-block copolymer mixture to reach a pre-selected softening point and forming a chemically grafted asphalt-polymer system.

2. A method as claimed in claim 1, wherein the block copolymer contains an unsaturated elastomeric midblock and polystyrene end blocks.

3. The method as claimed in claim 1, wherein the block copolymer comprises styrene-butadiene-styrene, styrene-isoprene-styrene or mixtures thereof.

4. The method as claimed in claim 1, wherein the pre-selected softening point is from about 175° F. to about 195° F.

5. The method as claimed in claim 1, wherein the block copolymer is comprised of from about 14 to about 40% polystyrene.

6. The method of claim 5, wherein the copolymer is present at about 8%, by weight and is a styrene-butadiene-styrene branched block copolymer with a polystyrene content of about 37%.

7. An asphalt composition produced by the method as claimed in claim 1.

8. An asphalt composition as claimed in claim 7 having a softening point of from about 175° F. to about 195° F., and a penetration from about 25 to about 50 at 77° F.

9. An asphalt composition made by blending the asphalt composition of claim 7 with an air blown asphalt.

10. An asphalt composition made by blending the asphalt composition of claim 8 with an air blown asphalt.

* * * * *